United States Patent [19]
Takiguchi

[11] Patent Number: 5,897,456
[45] Date of Patent: Apr. 27, 1999

[54] DOWNSHIFT CONTROL DEVICE FOR AUTOMATIC TRANSMISSION

[75] Inventor: Masahiro Takiguchi, Fuji, Japan

[73] Assignee: Jatco Corporation, Japan

[21] Appl. No.: 08/900,149

[22] Filed: Jul. 28, 1997

[30] Foreign Application Priority Data

Jul. 31, 1996 [JP] Japan .................................. 8-202507

[51] Int. Cl.$^6$ .............................................. F16H 61/08
[52] U.S. Cl. .......................................................... 477/146
[58] Field of Search ..................................... 477/145, 146

[56] References Cited

U.S. PATENT DOCUMENTS

| | | | |
|---|---|---|---|
| 5,085,103 | 2/1992 | Ando et al. | 477/145 |
| 5,800,309 | 9/1998 | Takiguchi et al. | 477/145 |

*Primary Examiner*—Dirk Wright
*Attorney, Agent, or Firm*—Rossi & Associates

[57] ABSTRACT

A downshift control device for an automatic transmission is provided in which the transmission is shifted down by releasing an oil pressure from a first engaging element that has been engaged while applying an oil pressure to a second engaging element that has been released. This downshift control device includes an applied pressure control actuator for controlling a pressure to be applied to the second engaging element, by supplying a pressurized oil to a back pressure chamber of an accumulator provided in an oil path to the second engaging element, and removing the pressurized oil from the back pressure chamber. This control actuator receives a first command to supply the pressurized oil to the back pressure chamber from the time when a downshift command is generated to a predetermined time or the time when a detected gear ratio starts being changed, and then receives a second command to remove the pressurized oil from the back pressure chamber until the detected gear ratio reaches a predetermined gear ratio just before completion of shifting. The control actuator then receives a third command to supply the pressurized oil to the back pressure chamber after the detected gear ratio reaches the predetermined gear ratio.

3 Claims, 6 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ◉ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| SOLENOID<br>GEAR POSITION | SHIFT SOLENOID A | SHIFT SOLENOID B |
|---|---|---|
| 1st | ○ | ○ |
| 2nd | × | ○ |
| 3rd | × | × |
| 4th | ○ | × |

○ ⋯ ON (DRAIN CLOSED)
× ⋯ OFF (DRAIN OPEN)

DOWNSHIFT CONTROL DEVICE FOR AUTOMATIC TRANSMISSION

BACKGROUND OF THE INVENTION

1. Field of the Invention

The present invention relates to a downshift control device for an automatic transmission, and more particularly to a technique for controlling a pressure applied to an engaging element through a back pressure of an accumulator in the process of shifting down of the transmission which is initiated by depressing an accelerator pedal or manually selecting a gear position while the vehicle is in a power-on condition.

2. Description of the Prior Art

There is known a shift control device for an automatic transmission as disclosed in Japanese laid-open Patent Publication No. 5-248526. In the shift control device shown in FIG. 5 of this publication, when a low clutch 50 is engaged to shift down the transmission from its 4th-speed to 3rd-speed gear position, a certain volume of oil is delivered to the low clutch 50 when conditions for start of the engagement of the low clutch 50 are satisfied, in order to eliminate a delay in time due to movement of a piston from its initial position to a position at which the piston is ready to apply a pressing force to a clutch plate. To deliver the oil to the low clutch 50, the control device is provided with an accumulator 62 having an oil chamber of a certain volume and serving to charge the clutch 50 with oil. The amount of the oil delivered to the low clutch 50 is determined so that the piston is moved to the position just before the pressing force of the piston is applied to the clutch plate. If the oil pressure in the oil chamber of the low clutch 50 is increased from this state in suitable timing, by controlling the back pressure of a low clutch accumulator 83, the low clutch 50 immediately start being engaged.

The known downshift control device, however, uses two accumulators, namely, clutch charging accumulator 62 and low clutch accumulator 83, for controlling the engaging pressure of the low clutch 50 upon downshifting from the 4th-speed to 3rd-speed gear position.

SUMMARY OF THE INVENTION

It is therefore a first object of the present invention to provide a downshift control device for an automatic transmission wherein the transmission is shifted down to a gear position to be established after downshifting, by releasing an oil pressure from a first engaging element that has been engaged in a gear position established before the downshifting while applying an oil pressure to a second engaging element that has been released in the gear position established before the downshifting, which control device assures good timing and high response with which the second engaging element is engaged upon downshifting in a power-on condition, without incurring increases in the size and cost of the hydraulic control device.

It is a second object of the invention to provide such a downshift control device as described above, which is able to prevent racing of the engine during supply of a preliminary pressure to the second engaging element.

It is a third object of the invention to provide the downshift control device as described above, wherein the pressure applied to the second engaging element is increased upon detection of a suitable gear ratio, at an appropriate point of time selected in a certain range, allowing for some variations in shift conditions.

To accomplish the first object, there is provided a downshift control device for an automatic transmission wherein the transmission is shifted down to a first gear position to be established after downshifting, by releasing an oil pressure from a first engaging element "a" that has been engaged in a second gear position established before the downshifting while applying an oil pressure to a second engaging element "b" that has been released in the second gear position, the downshift control device comprising: power-on downshift determining means "c" for determining whether a downshift command is generated to shift down the automatic transmission by depressing an accelerator pedal; gear ratio detecting means "d" for detecting a gear ratio that changes during power-on downshift control; an accumulator "e" provided in an oil path that leads to the second engaging element "b" that is to be engaged upon downshifting; an applied pressure control actuator "f" for controlling a pressure to be applied to the second engaging element, by selectively supplying a pressurized oil to a back pressure chamber of the accumulator "e" and removing the pressurized oil from the back pressure chamber; and downshift applied pressure control means "g" for generating a first command to supply the pressurized oil to the back pressure chamber of the accumulator, during a period starting from a first time when the downshift command is generated to a second predetermined time or a second time when the gear ratio detected by the gear ratio detecting means starts being changed, then generating a second command to remove the pressurized oil from the back pressure chamber until the detected gear ratio reaches a predetermined gear ratio just before completion of shifting, and then generating a third command to supply the pressurized oil after the detected gear ratio reaches the predetermined gear ratio, the first, second and third commands being generated to the applied pressure control actuator "f".

The operation of the downshift control device constructed as described above will be explained. If the power-on downshift determining means "c" determines that a downshift command is generated to shift down the transmission by depressing the accelerator pedal during running of the vehicle, a shift valve(s) or the like is switched so as to release the oil pressure from the first engaging element "a" that has been engaged in the second gear position before downshifting, and apply the oil pressure to the second engaging element "b" that has been released in the second gear position, while monitoring the gear ratio detected by the gear ratio detecting means "d".

Then, the downshift applied pressure control means "g" generates a command to supply the pressurized oil to the applied pressure control actuator "f" during a period starting from the time when the downshift command is generated to the predetermined time or the time when the detected gear ratio starts being changed, and then generates a command to remove the pressurized oil from the actuator "f" until the detected gear ratio reaches a predetermined gear ratio just before completion of shifting. Then, the control means "g" generates a command to supply the pressurized oil to the actuator "f" after the detected gear ratio reaches the predetermined gear ratio. Accordingly, the pressure applied to the second engaging element "b" is temporarily increased due to supply of the pressurized oil to the accumulator "e" in the initial stage of the power-on downshifting, so that the piston of the second engaging element "b" is moved from its initial position to a position at which the piston is ready to apply a pressing force to between engaging plates. Thereafter, the pressurized oil to the accumulator "e" is removed until the detected gear ratio reaches a predetermined gear ratio just before completion of shifting, so that the second engaging element "b" is held in a standby position just before the engagement. Once the detected gear ratio reaches the predetermined gear ratio, the pressurized oil is supplied to the accumulator "e" to increase the pressure applied to the second engaging element "b", so that the engaging element "b" that has been held in the standby condition just before its engagement is immediately engaged with its engagement capacity achieved without delay in quick response to the supply of the pressurized oil. Thus, the downshift control device constructed as described above can assure good engaging timing with high response upon power-on downshifting, without incurring increases in the size and cost of the hydraulic control device.

To accomplish the second object, the downshift control device for an automatic transmission constructed as described above may further include downshift released pressure control means "i" for generating to a released pressure control actuator "h" a command to maintain an engaging capacity of the first engaging element "a" to be released upon downshifting, during the period starting from the first time when the downshift command is generated to the second predetermined time or second time when the gear ratio detected by the gear ratio detecting means starts being changed, while the command to supply the pressurized oil is generated to the applied pressure control actuator "f".

If the oil pressure to the first engaging element "a" to be released is removed at the same time that the downshift command is generated in the case where the pressure applied to the second engaging element "b" is increased in the initial stage of the power-on downshifting, the shifting may proceed with a change in the gear ratio of the transmission, resulting in racing of the engine. According to the present invention, on the other hand, the downshift released pressure control means "i" performs control for maintaining an engaging capacity of the first engaging element "a" to be released, during the supply of the preliminary pressure to the second engaging element "b", whereby the gear position established before the downshifting can be maintained, without causing racing of the engine.

To accomplish the third object of the invention, the downshift control device for an automatic transmission as described just above may be adapted such that the downshift released pressure control means "i" temporarily generates a command to increase the engaging capacity of the first engaging element "a" to the released pressure control actuator "h", from a point of time when the detected gear ratio reaches a gear ratio that is smaller than the above-indicated predetermined gear ratio.

Upon power-on downshifting, the downshift released pressure control means "i" temporarily increases the released pressure of the first engaging element "a" that is being lowered, before the downshift applied pressure control means "g" increases the pressure applied to the second engaging element "b", so that the slope of increase of the engine speed (turbine speed) (=slope of increase in the gear ratio) is kept being small. Thus, the downshift applied pressure control means "g" is able to increase the pressure to be applied to the second engaging element "b" upon detection of a suitable gear ratio, at an appropriate point of time selected in a certain range, allowing for some variations in shift conditions.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

The first embodiment of the present invention in the form of a downshift control device for an automatic transmission will be hereinafter described.

First, there will be schematically described the whole construction of the automatic transmission in which the downshift control device of the first embodiment is employed.

Figure 1:
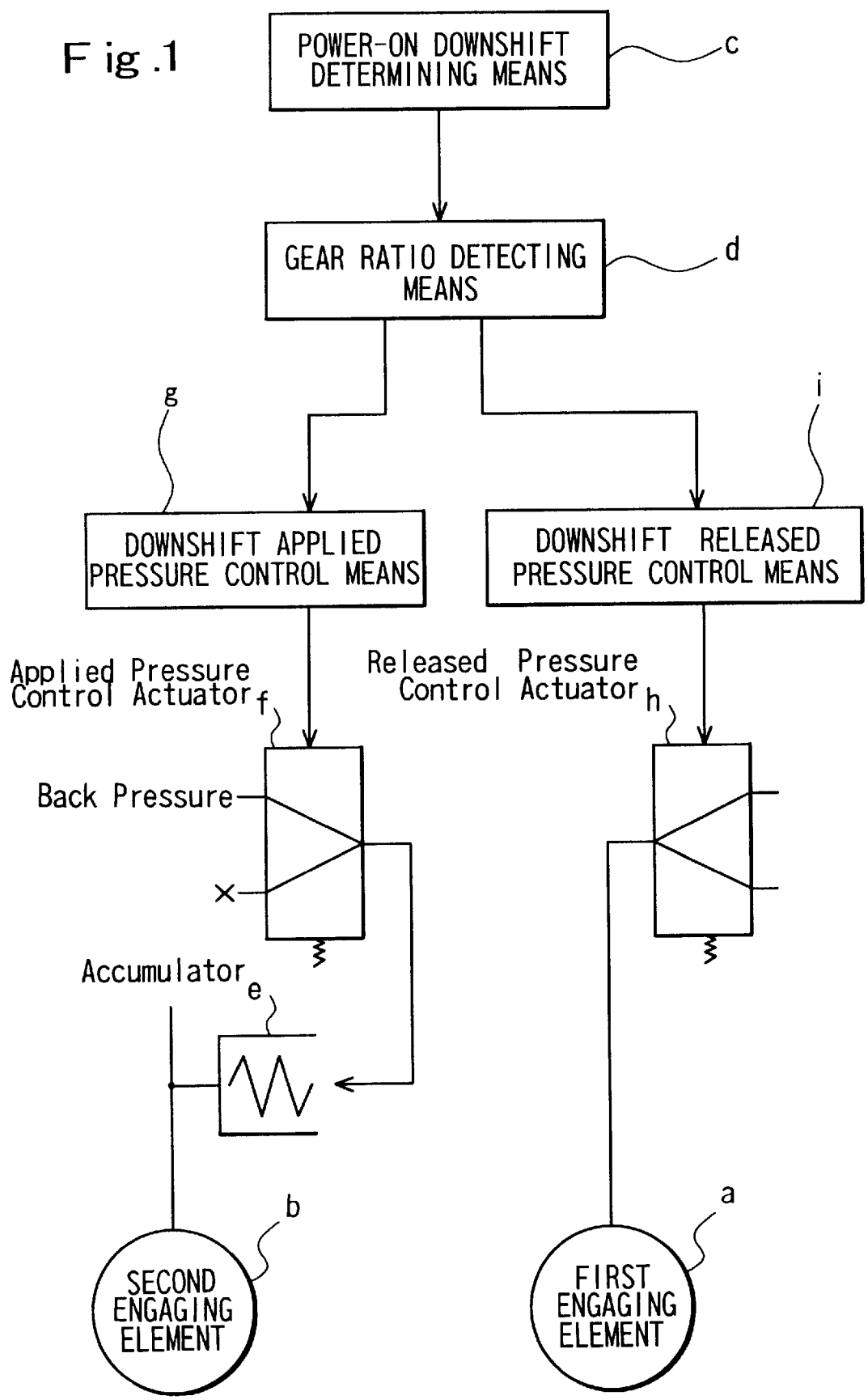
FIG. 1 is a view showing the construction of a downshift control device for an automatic transmission according to the present invention.
Figures 2, 3:
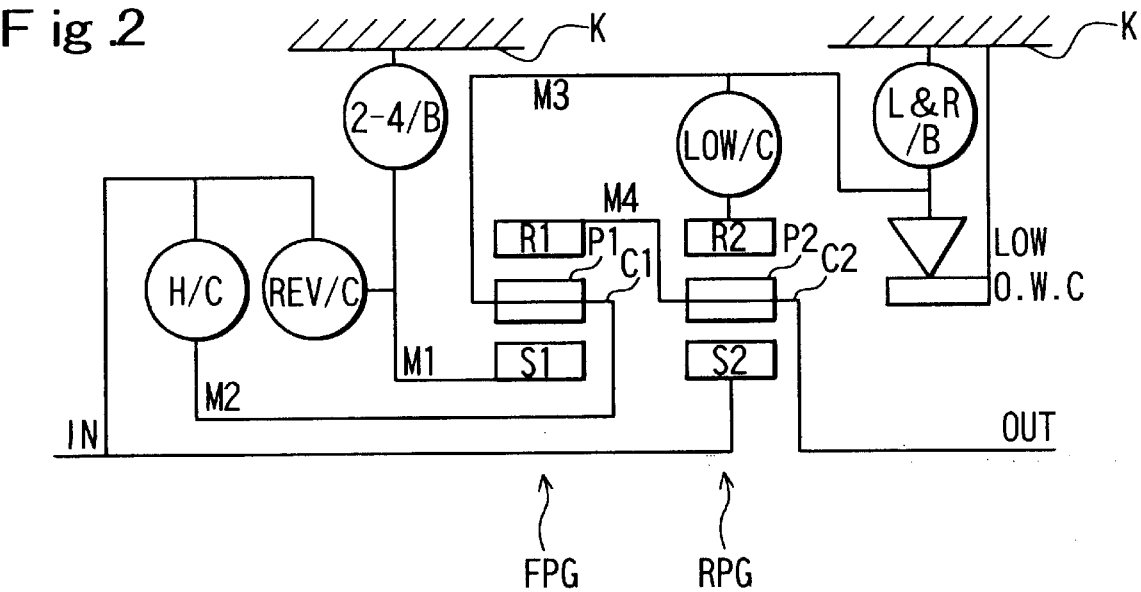
FIG. 2 is a view schematically showing a power transmitting mechanism of the automatic transmission using the hydraulic control device of the first embodiment of the invention.
FIG. 3 is a table showing engaging states of elements of the automatic transmission using the hydraulic control device of the first embodiment.

FIG. 2 is a view schematically showing a power transmitting system of the automatic transmission. In FIG. 2, IN is an input shaft, and OUT is an output shaft, while FPG is a front planetary gear system, and RPG is a rear planetary gear system. The front planetary gear system FPG includes a first sun gear S1, a first ring gear R1, a first pinion P1 and a first pinion carrier C1. The rear planetary gear system RPG includes a second sun gear S2, a second ring gear R2, a second pinion P2 and a second pinion carrier C2.

Engaging elements for establishing forward 4-speed, reverse 1-speed gear positions by using the above-described gear train arrangement are provided which include a reverse clutch REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and low one-way clutch LOW O.W.C.

The first sun gear S1 is connected to the input shaft IN through a first rotary member M1 and the reverse clutch R/C, and also connected to a case K through the first rotary member M1 and the 2-4 brake 2-4/B.

The first carrier C1 is connected to the input shaft IN through a second rotary member M2 and the high clutch H/C, and also connected to the case K through a third rotary member M3 and the low&reverse brake L&R/B. Further, the first carrier C1 is connected to the second ring gear R2 through the third rotary member M3 and the low clutch L/C. The low one-way clutch LOW O.W.C. is disposed in parallel with the low&reverse brake L&R/B.

The first ring gear R1 is directly connected to the second carrier C2 through a fourth rotary member M4, and the output shaft OUT is directly connected to the second carrier C2. The second sun gear S2 is directly connected to the input shaft IN.

This power transmitting system is characterized in that it does not include a one-way clutch for controlling the shift timing so as to eliminate shift shocks upon shifting-down from the 4th-speed to 3rd-speed gear position, and a clutch that is hydraulically engaged and needed for ensuring the effect of engine brakes when the above one-way clutch is employed. Thus, the number of engaging elements is reduced, leading to reduced size and weight of the power transmitting system.

FIG. 3 is a view showing engaged and unengaged states of the engaging elements of the above-described power transmitting system for establishing the forward 4-speed, reverse 1-speed gear positions.

The 1st-speed gear position is established by hydraulically engaging the low clutch L/C, and hydraulically engaging the low&reverse brake L&R/B (when an engine brake range is selected) or mechanically engaging the low one-way clutch LOW O.W.C. (when the vehicle is accelerated). In this case, the second sun gear S2 is connected to the input shaft IN, and the second ring gear R2 is fixed, while the second carrier C2 is connected to the output shaft OUT.

The 2nd-speed gear position is established by hydraulically engaging the low clutch L/C and the 2-4 brake 2-4/B. In this case, the second sun gear S2 is connected to the input shaft IN, and the first sun gear S1 is fixed, while the second carrier C2 is connected to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the second ring gear R2 is connected to the output shaft OUT, so that the transmission gear ratio becomes equal to 1.

The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the second carrier C2 is connected to the output shaft OUT, so as to establish the overdrive gear position.

The reverse gear position is established by hydraulically engaging the reverse clutch REV/C and the low&reverse brake L&R/B. In this case, the first and second sun gears S1, S2 are connected to the input shaft IN, and the first carrier C1 is fixed, while the second carrier C2 is connected to the output shaft OUT.

The 2-4 brake 2-4/B is a multiple-disc brake that is constructed similarly to a multiple-disc clutch.

Figure 4:
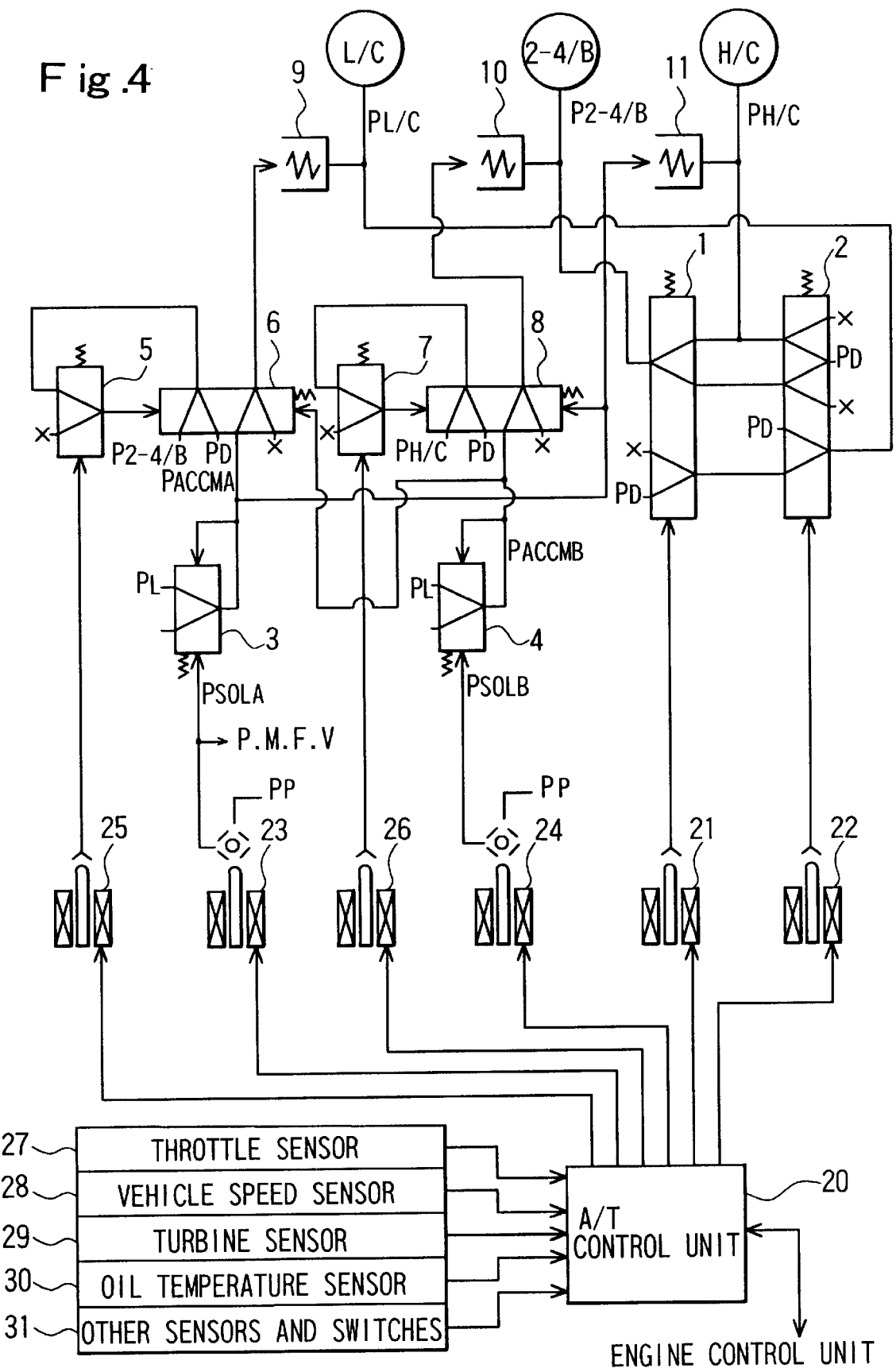
FIG. 4 is a diagram showing the whole control system including a hydraulic control portion and an electronic control portion of the downshift control device of the first embodiment.

FIG. 4 is a control system diagram showing a control valve portion, an electronic control portion, and engaging elements for automatically shifting the transmission to establish one of the above-indicated 1st-speed to 4th-speed gear positions in the D (drive) range. In Fig. 4, the low clutch L/C, 2-4 brake 2-4/B and high clutch H/C are provided as the engaging elements.

In the control valve portion of FIG. 4, there are provided a shift valve (A) 1, shift valve (B) 2, accumulator control valve (A) 3, accumulator control valve (B) 4, low clutch timing valve 5, low clutch sequence valve 6, 2-4 brake timing valve 7, 2-4 brake sequence valve 8, low clutch accumulator 9, 2-4 brake accumulator 10 and high clutch accumulator 11.

The shift valve (A) 1 and shift valve (B) 2 are adapted to switch oil paths to establish each of the 1st-speed to 4th-speed (overdrive) gear positions according to the operation of a shift solenoid (A) 21 and a shift solenoid (B) 22, respectively.

The accumulator control valve (A) 3 reduces a line pressure PL depending upon the level of a solenoid pressure PSOLA produced by a line pressure duty solenoid 23, so as to produce an accumulator control pressure (A) PACCMA. The solenoid pressure PSOLA produced by the line pressure duty solenoid 23 is also led to a pressure modifier valve adapted to produce a modifier pressure that serves as a signal pressure for the line pressure PL produced by a pressure regulator valve (not shown).

The accumulator control valve (B) 4 reduces the line pressure PL depending upon the level of a solenoid pressure PSOLB produced by a 2-4/B duty solenoid 24, so as to produce an accumulator control pressure (B) PACCMB.

The low clutch timing valve 5 is a switch valve that drains a signal pressure oil path when a low clutch timing solenoid 25 is OFF, and produces the oil pressure for communication of the signal pressure oil path when the solenoid 25 is ON. The low clutch sequence valve 6 is adapted to control the back pressure of the low clutch accumulator 9 upon shifting-up to the 4th-speed gear position or shifting-down from the 4th-speed gear position.

The 2-4 brake timing valve 7 is a switch valve that drains the signal pressure oil path when a 2-4 brake timing solenoid 26 is OFF, and produces an oil pressure for communication of the signal pressure oil path when the solenoid 26 is ON. The 2-4 brake sequence valve 8 is adapted to control the back pressure of the 2-4 brake accumulator 10 upon shifting-up to the 3rd-speed gear position or shifting-down from the 3rd-speed gear position.

The low clutch accumulator 9 has a back pressure chamber to which the accumulator control pressure (A) PACCMA is applied through the low clutch sequence valve 6, so as to smoothly engage and release the low clutch L/C. The 2-4 brake accumulator 10 has a back pressure chamber to which the accumulator control pressure (B) PACCMB is applied through the 2-4 brake sequence valve 8, so as to smoothly engage and release the 2-4 brake 2-4/B. The high clutch accumulator 11 has a back pressure chamber to which the accumulator control pressure (A) PACCMA is directly applied, so as to smoothly engage and release the high clutch H/C.

The electronic control portion of FIG. 4 includes shift solenoid (A) 21, shift solenoid (B) 22, line pressure duty solenoid 23, 2-4/B duty solenoid 24, low clutch timing solenoid 25 and 2-4/B timing solenoid 26, as actuators for controlling oil pressures according to drive commands generated by an A/T control unit 20.

The A/T control unit 20 receives as input information various signals from various sensors, such as a throttle sensor 27 for detecting the throttle opening of a throttle valve, a vehicle speed sensor 28 for detecting the vehicle speed, a turbine sensor 29 for detecting the rotating speed of a turbine runner, oil temperature sensor 30 for detecting the oil temperature, and other sensors and switches 31.

Figures 5, 6:
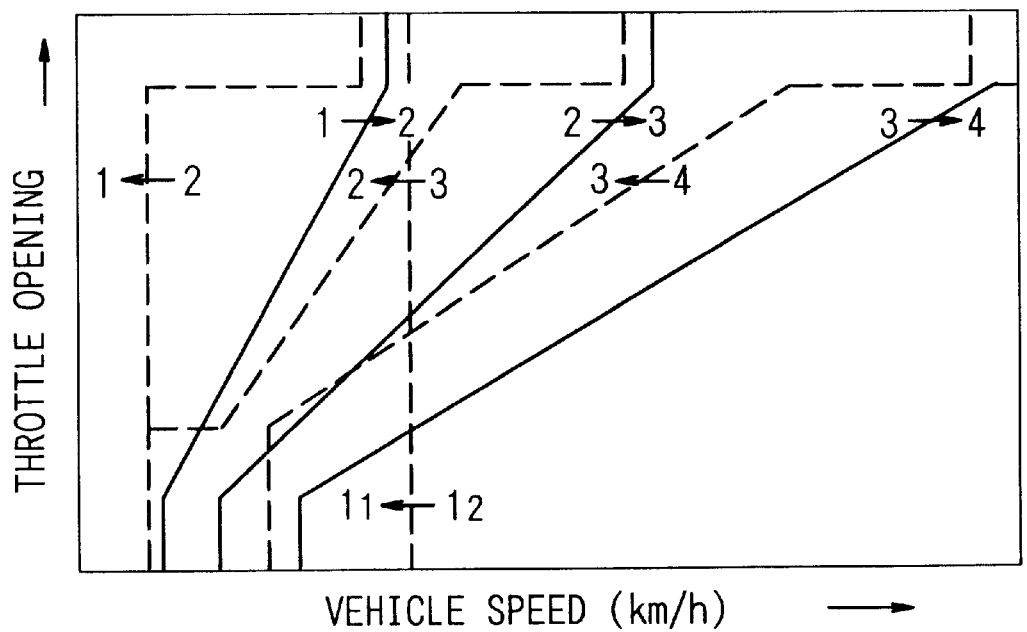
FIG. 5 is a table showing operated states of shift solenoids of the hydraulic control device of the first embodiment.
FIG. 6 is a graph showing one example of gear change point characteristics employed by the hydraulic control device of the first embodiment.

To perform shift control for automatically shifting the transmission from one of the 1st-speed to 4th-speed gear positions to another in the D (drive) range, a gear change command is first generated based on the graph of FIG. 6 indicating gear change points in relation to the detected throttle opening and vehicle speed, when the current point (relationship between the throttle opening and vehicle speed) on the graph passes one of upshifting and downshifting lines, and the gear position to which the transmission should be shifted is determined by this gear change command. To establish the thus determined gear position, the A/T control unit 20 generates ON- or OFF-command to each of the shift solenoid (A) 21 and shift solenoid (B) 22 according to the table of FIG. 5 indicating operated states of the shift solenoids.

There will be next explained the operation of the present embodiment.

Electronic Control Operation upon 4-3 Power-on Downshifting

Figure 7:
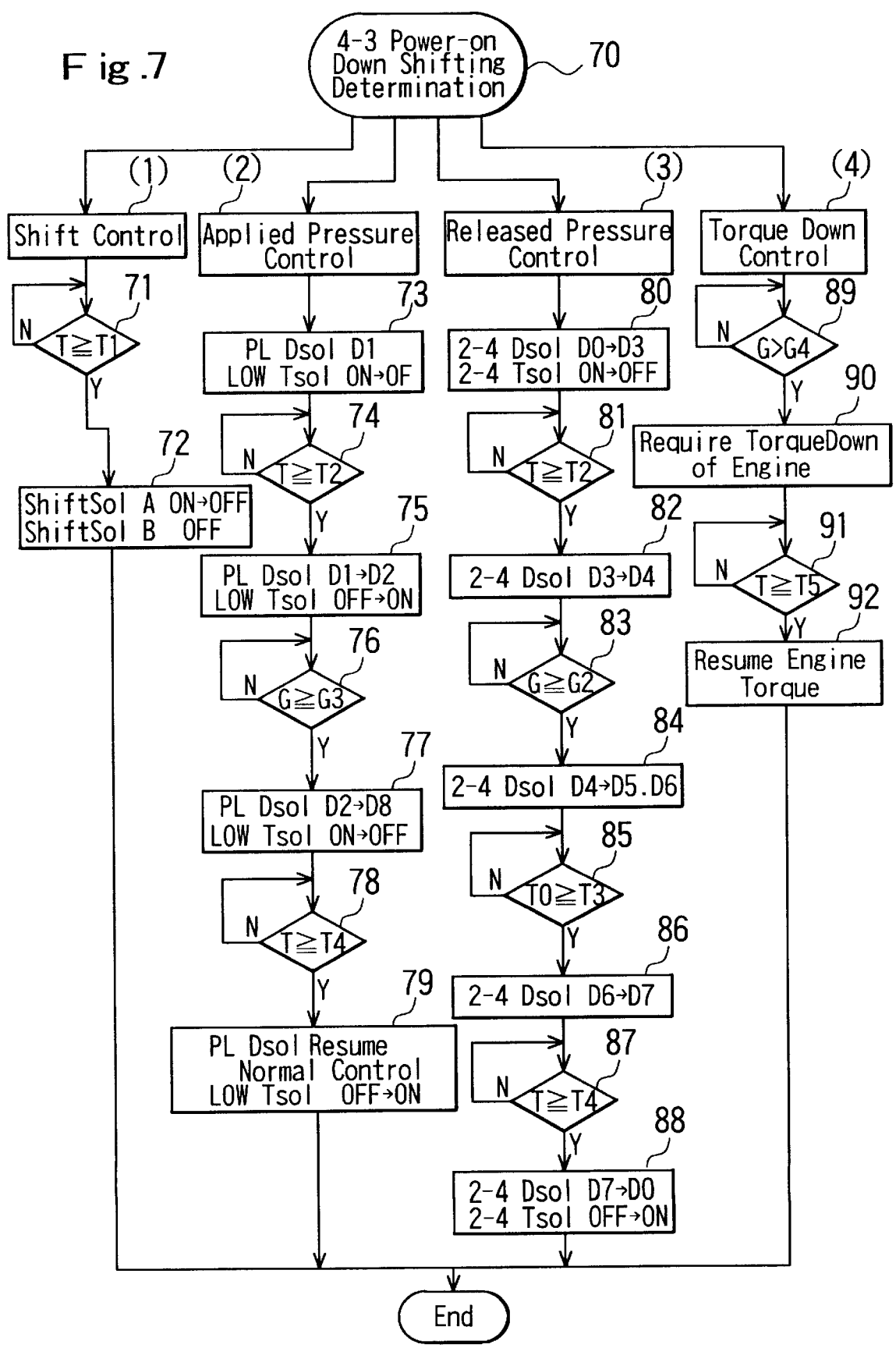
FIG. 7 is a flowchart showing the flow of power-on 4th-speed to 3rd-speed downshift control performed by an A/T control unit of the first embodiment.
Figure 8:
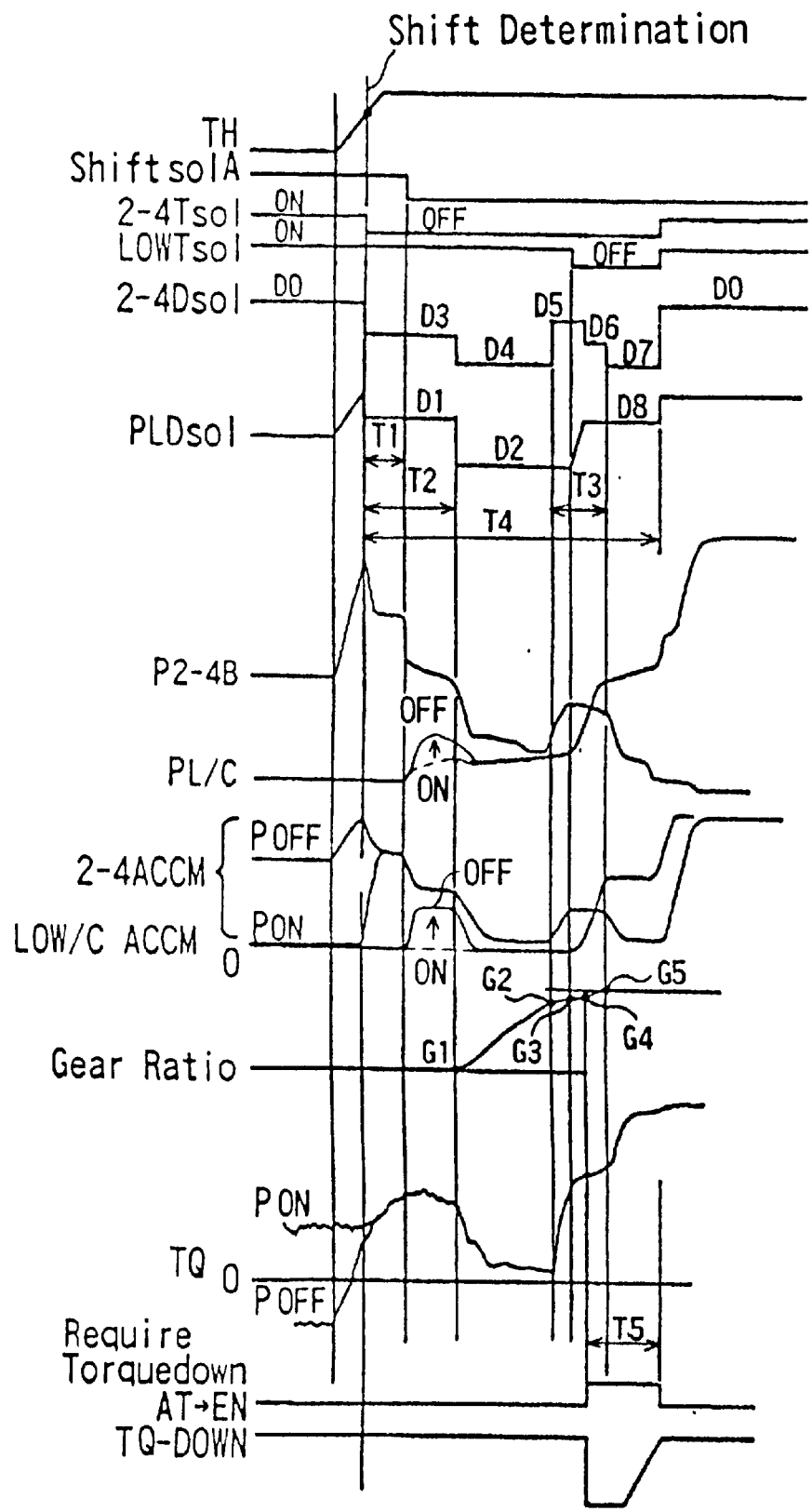
FIG. 8 is a time chart showing respective transient characteristics of control commands, oil pressure, gear ratio, torque and others during the power-on 4th-speed to 3rd-speed downshift operation of the first embodiment.

FIG. 7 is a flow chart showing the flow of the downshift control performed by the A/T control unit 20 when the transmission is shifted down from the 4th-speed to 3rd -speed gear position while an accelerator pedal is depressed, in which control the 2-4 brake 2-4/B (corresponding to the first engaging element "a") is released and the low clutch (corresponding to the second engaging element "b") is engaged. FIG. 8 is a time chart showing transient characteristics of control commands, oil pressures, gear ratio, torque and others during the 4-3 power-on downshifting.

Initially, in step 70 of FIG. 7, it is determined whether the transmission is being shifted down from the 4th-speed to 3rd-speed gear position while the accelerator pedal is being depressed. An affirmative decision (YES) is obtained in this step if two conditions are satisfied, that is, the current point (relationship between the throttle opening and the vehicle speed) on the graph of FIG. 6 indicating gear change points passes the 4-3 downshifting line and a 4-3 downshift command is generated, and the throttle opening is being increased. In this connection, the increase of the throttle opening is determined by calculating a differential value dTH of a detected value TH of the throttle opening received from the throttle sensor 27, and determining that the obtained differential value dTH is larger than zero.

If it is determined that the transmission is shifted down from the 4th-speed to 3rd-speed gear position with the accelerator pedal being depressed, shift control (1), applied pressure control (2), released pressure control (3) and torque down control (4) are implemented independently of each other. If a command to implement the power-on 4-3 downshifting is generated, a timer value T representing the time elapsed after generation of the power-on 4-3 downshift command starts being increased, and arithmetic processing is occasionally performed to determine the actual or current gear ratio G that is the ratio of the turbine speed (rotating speed of the input shaft of the transmission) to the vehicle speed (rotating speed of the output shaft of the transmission), so as to observe changes in the gear ratio from the time when the power-on 4-3 downshift command is generated.

(1) Shift Control

In step 71, it is determined whether the timer value T is equal to or larger than a first predetermined timer value Ti. If an affirmative decision (YES) is obtained in step 71, step 72 is executed to switch a command to the shift solenoid (A) 21 from ON to OFF, and keep generating an OFF command to the shift solenoid (B) 22.

(2) Applied Pressure Control

In controlling the pressure to be applied to the low clutch L/C, the line pressure duty solenoid 23 and low-clutch timing solenoid 25 serve as control actuators.

In step 73, a command in the form of duty ratio D1 is generated to the line pressure duty solenoid 23 at the same time that the shift command is generated, and a command to switch the low clutch timing solenoid 25 from ON to OFF is generated.

In step 74, it is determined whether the timer value T is equal to or larger than a second predetermined timer value T2. If an affirmative decision (YES) is obtained in step 74, step 75 is then executed to generate a command to rapidly reduce the duty ratio of the line pressure duty solenoid 23 from D1 to D2, and generate a command to switch the low clutch timing solenoid 25 from OFF to ON.

In step 76, it is determined whether the actual gear ratio G is equal to or larger than a third predetermined gear ratio G3. If an affirmative decision (YES) is obtained in step 76, step 77 is then executed to generate a command to gradually increase the duty ratio of the line pressure duty solenoid 23 from D2 to D8, and generate a command to switch the low clutch timing solenoid 25 from ON to OFF.

In step 78, it is determined whether the timer value T is equal to or larger than a fourth predetermined timer value T4 (that indicates the time when the shifting operation is completed). In step 79, normal control is resumed in which a command corresponding to the degree of the throttle opening TH is given to the line pressure duty solenoid 23, while a command is generated to switch the low clutch timing solenoid 25 from OFF to ON.

(3) Released Pressure Control

In controlling the pressure released from the 2-4 brake 2-4/B, the 2-4/B duty solenoid 24 and 2-4/B timing solenoid 26 serve as control actuators.

In step 80, a command to reduce the duty ratio of the 2-4 duty solenoid 24 from D0 to D3 is generated at the same time that the downshift command is generated. Also, an ON command that has been generated to the 2-4/B timing solenoid 26 is replaced by an OFF command.

In step 81, it is determined whether the timer value T is equal to or larger than the second predetermined timer value T2. If an affirmative decision (YES) is obtained in step 81, a command to reduce the duty ratio of the 2-4B duty solenoid 24 from D3 to D4 is generated.

In step 83, it is determined whether the actual gear ratio G is equal to or larger than a second predetermined gear ratio G2 (<G3) or not. If an affirmative decision (YES) is obtained in step 83, step 84 is executed to rapidly increase the duty ratio of the 2-4/B duty solenoid 24 from D4 to D5, and then generate a command to maintain the duty ratio at the level of D6.

In step 85, it is determined whether the timer value T0 that starts being counted at the point of time when the actual gear ratio G reaches the second predetermined gear ratio G2 is equal to or larger than the third predetermined timer value T3. If an affirmative decision (YES) is obtained in step 85, step 86 is then executed to reduce the duty ratio of the 2-4/B duty solenoid 24 from D6 to D7.

In step 87, it is determined whether the timer value T is equal to or larger than the fourth predetermined timer value T4. If an affirmative decision (YES) is obtained in step 87, step 88 is executed to return the duty ratio of the 2-4B duty solenoid 24 from D7 to D0 for normal control, and generate an ON command to the 2-4B timing solenoid 26.

(4) Torque Down Control

In step 89, it is determined whether the actual gear ratio G is equal to or larger than a fourth predetermined gear ratio G4 (>G3) or not. If an affirmative decision (YES) is obtained in step 89, the A/T control unit 20 requires an engine control unit to reduce the engine torque by cutting the fuel or retarding ignition timing, for example.

In step 91, it is determined whether the timer value T is equal to or larger than a fifth predetermined timer value T5. If an affirmative decision (YES) is obtained in step 91, step 92 is executed to recover or resume the engine torque to a normal level.

Shift Control Operation

The shift control as described above is characterized in that the shift valve is not actuated to initiate the shifting operation at the same time that the downshift command is generated, but the shifting is initiated upon a lapse of delay time that is a duration between the time when the downshift command is generated and the time when the first predetermined timer value T1 is reached.

Accordingly, the engine speed NE is increased with the accelerator pedal depressed during the delay time from the generation of the downshift command to the first predetermined timer value T1, and, when the shifting operation is actually started by generating the ON command to the shift solenoid (A) 21 to turn on the solenoid (A) 21, the engine speed has been increased so that the shifting can be always started in the power-on condition no matter whether the vehicle is in the power-off state or power-on state before the transmission is shifted down from the 4th-speed to 3rd-speed gear position.

As a result, the shifting operation can be terminated in almost the same timing irrespective of whether the vehicle is in the power-on or power-off state before generation of the downshift command, thus eliminating a need to set two different modes, i.e., one mode for power-on 4-3 downshifting from the power-off state, and the other mode for power-on 4-3 downshifting from the power-on state, when controlling transient oil pressures in the transmission system. Namely, the same control can be performed for controlling the transient oil pressures during shifting no matter whether the vehicle is in the power-on or power-off state before the downshift command is generated.

Transient Oil Pressure Control during Shifting

When it is determined during running of the vehicle that the transmission is being shifted down from the 4th-speed to 3rd-speed gear position while the accelerator pedal is being depressed, the shift valve (A) 21 is switched thereby to release the oil pressure from the 2-4 brake 2-4/B that has been engaged in the 4th-speed gear position, and applying the oil pressure to the low clutch L/C that has been released in the 4th-speed gear position. In this oil pressure control, the pressure applied to the low clutch L/C is controlled by controlling the line pressure duty solenoid 23 and low clutch timing solenoid 25, and the pressure released from the 2-4 brake 2-4/B is controlled by controlling the 2-4B duty solenoid 24 and 2-4B timing solenoid 26. Thus, the pressure applied to the low clutch L/C and the pressure released from the 2-4 brake 2-4/B are controlled independently of each other. There will be hereinafter described characteristics of the transient oil pressure control during shifting.

(1) The first characteristic is in that the pressure applied to the low clutch L/C is controlled by generating an OFF command (command to supply a pressurized oil) to the low clutch timing solenoid 25 from the time when the power-on 4-3 downshift command is generated to the time when the timer counts the second predetermined timer value T2, then generating an ON command (command to remove the pressurized oil) to the low clutch timing solenoid 25 until the actual gear ratio G reaches the third predetermined gear ratio just before completion of the shifting, and then generating an OFF command to the timing solenoid 25 after the actual gear ratio G has reached the third predetermined gear ratio G3.

In the above manner, the pressurized oil is supplied to the low clutch accumulator 9 provided in an oil path leading to the low clutch L/C, from the time of generation of the power-on 4-3 downshift command to the time represented by the second predetermined timer value T2, whereby the back pressure of the low clutch accumulator 9 is increased from the time represented by the first predetermined timer value T1 when the shift solenoid (A) 21 is switched off to the time represented by the second predetermined timer value T2, as shown in FIG. 8. As a result, the pressure applied to the low clutch L/C is temporarily increased, and a piston of the low clutch L/C is moved from its initial position to a position at which a clearance between clutch plates is reduced enough to allow the piston to immediately apply a pressing force to the clutch plates.

Thereafter, the pressurized oil to the low clutch accumulator 9 is removed until the actual gear ratio G reaches the third predetermined gear ratio G3, so that the low clutch L/C is held in a standby position just before its engagement. Namely, once the piston of the low clutch L/C, which has a constant sliding frictional resistance, moves to one side, i.e., the standby position, it does not return to the other side due to a small pressure difference, or does not completely return to the released position or initial position even if it returns.

When the actual gear ratio G reaches the third predetermined gear ratio G3, and the pressurized oil is supplied to the low clutch accumulator 9, the low clutch L/C that has been held in the standby condition just before its engagement by the above pre-charging pressure is immediately engaged with its engagement capacity achieved without delay in quick response to the pressurized oil.

(2) The second characteristic is in that a command to establish the duty ratio of D3 (command to maintain the engagement capacity of the 2-4 brake 2-4B) is generated to the 2-4B duty solenoid 24 of the 2-4 brake 2-4B that is to be released upon downshifting, during the period from the time of generation of the power-on 4-3 downshift command to the time represented by the second predetermined timer value T2, namely, while the OFF command (command to supply the pressurized oil) is generated to the low clutch timing solenoid 25 for control of the applied pressure.

If the oil pressure to the 2-4brake 2-4/B to be released is removed at the same time that the downshift command is generated in the case where the pressure applied to the low clutch L/C is increased in the initial stage of power-on 4-3 downshifting as described above, the shifting may proceed with a change in the gear ratio of the transmission, resulting in racing of the engine.

In the present embodiment, on the other hand, the pressure to be released upon downshifting is controlled so as to maintain the engagement capacity of the 2-4 brake 2-4/B to be released, during the period in which the pre-charging pressure is applied to the low clutch L/C. Therefore, the transmission is held in the 4th-speed gear position before the downshifting until the timer counts the second predetermined timer value T2, as is understood from the GEAR RATIO characteristic in FIG. 8, so as to avoid racing of the engine.

(3) The third characteristic is in that the released pressure of the 2-4 brake 2-4/B that is being lowered is temporarily increased when the actual gear ratio G reaches the second predetermined gear ratio G2 in the later period of shifting. Subsequently, the pressure applied to the low clutch L/C is increased when the actual gear ratio G reaches the third predetermined gear ratio G3 that is larger than the second predetermined gear ratio G2 and is established just before completion of the shifting.

In the above manner, the released pressure of the 2-4 brake 2-4B that is being lowered is controlled to be temporarily increased prior to the control of the pressure applied to the low clutch L/C to achieve the engagement capacity, utilizing the difference between the second predetermined gear ratio G2 and the third predetermined gear ratio G3. By temporarily increasing the released pressure, namely, by establishing the oil pressure with the duty ratio of D5, the slope of increase of the engine speed (turbine speed), or slope of increase in the gear ratio, is kept being small, as shown in FIG. 8, so that the pressure to be applied to the low clutch L/C can be increased in appropriate timing when the gear ratio reaches the third predetermined gear ratio G3, while allowing for some variations in the timing of the increase of the pressure. Thus, even where rotating conditions of the input and output shafts of the transmission and oil temperatures slightly differ in each shift-down operation, the input and output shafts of the transmission are caused to rotate in synchronization upon shifting, without causing pull-in shocks or thrust shocks.

Since the released pressure established by the duty ratio D6 is maintained during the time set by the third predetermined timer value T3, an overshoot of the output torque occurring upon engagement of the low clutch L/C due to the increase in the pressure applied to the lower clutch L/C is eliminated, and the shock level determined by a change in the output torque can be reduced. Two different levels of duty ratios D5, D6 are provided because the oil pressure established by the duty ratio D5 serves to limit the increase in the rotating speed of the engine, while the pressure established by the duty ratio D6 serves to reduce shocks by eliminating the overshoot of the output torque.

Since the released pressure thus increased is lowered again after the increased pressure is maintained for the period corresponding to the third predetermined timer value T3, the output torque that has been prevented from increasing is increased again, to assure high accelerating capability of the vehicle immediately after the shifting.

(4) The fourth characteristic is in that the back pressure of the low clutch accumulator 9 provided in the oil path leading to the low clutch L/C is controlled so as to control the pressure applied to the low clutch L/C.

Namely, as a method for controlling the pressure applied to the low clutch L/C, the oil pressure applied to the low clutch L/C may be directly controlled. In this direct control method, however, the pressure control is greatly affected by the flow rate in oil chambers and oil paths, and thus suffers from lack of stability. Where the back pressure of the low clutch accumulator 9 provided in the oil path leading to the low clutch L/C is controlled so as to provide shelf-pressure characteristics, on the other hand, the engaging pressure applied to the low clutch L/C is immediately changed by varying the accumulator back pressure, thus assuring quick response and high stability. Further, the control of the back pressure of the low clutch accumulator 9 can be easily accomplished by switching on and off the low clutch timing solenoid 25.

Torque Down Control Operation

In the later period of the power-on 4-3 downshifting in which the output torque TQ is greatly increased, the torque down control is implemented to temporarily reduce the engine torque by cutting the fuel, for example.

With the torque down control for reducing the engine torque performed along with other controls for the power-on 4-3 downshifting, variations in the output torque TQ can be reduced, assuring reduced shift shocks and high shifting quality.

There will be described the effects of the present embodiment.

(1) In the present control device, the pressure to be applied upon downshifting is controlled by generating the OFF command (to supply the pressurized oil) to the low clutch timing solenoid 25 from the time when the 4-3 power-on down shift command is generated to the time corresponding to the second predetermined timer value T2, then generating the ON command (to remove the pressurized oil) to the low clutch timing solenoid 25 until the actual gear ratio G reaches the third predetermined gear ratio G3 just before completion of the shifting, and generating an OFF command after the actual gear ratio G reaches the third predetermined gear ratio G3. Thus, upon power-on 4-3 downshifting, the pressure to be applied to the low clutch L/C is controlled by using a single low clutch accumulator 9, to ensure appropriate engagement timing with quick response, without incurring increases in the size and cost of the hydraulic control device.

(2) In the control device of the present embodiment, the command to give the duty ratio D3 to the 2-4/B duty solenoid 24 of the 2-4 brake 2-4/B to be released upon downshifting (command to maintain the engaging capacity of the 2-4 brake 2-4/B) is generated during a period from the time when the power-on 4-3 downshift command is generated to the time corresponding to the second predetermined timer value T2, namely, while the OFF command (to supply the pressurized oil) is generated to control the pressure to be applied to the low clutch L/C. With the duty ratio of the 2-4/B duty solenoid 24 thus controlled, the engine is prevented from racing while the pre-charging pressure is applied to the low clutch L/C.

(3) In the control device of the present embodiment, the released pressure of the 2-4 brake 2-4/B that is being lowered is temporarily increased when the actual gear ratio G reaches the second predetermined gear ratio G2 in the later period of shifting, and then the pressure to be applied to the low clutch L/C is increased when the actual gear ratio G reaches the third predetermined gear ratio G3 that is larger than the second predetermined gear ratio G2 and is established just before completion of the shifting. In this arrangement, the timing of increasing the pressure applied to the low clutch L/C, which is determined by monitoring the gear ratio, can be selected in a certain range that allows for some variations in shifting conditions.

Modifications of the Embodiments

While the power-on 4th-speed to 3rd-speed downshifting has been described by way of example in the illustrated embodiment, the downshift control according to the present invention is also applicable to power-on 3rd-speed to 2nd-speed and 4th-speed to 2nd-speed shift-down operations, and to 5th-speed to 4th-speed and 5th-speed to 3rd-speed shift-down operations when the automatic transmission has five gear positions. The downshift control of the present invention may also be applied when the lower gear position is manually selected to shift down the transmission while the vehicle is in the power-on condition.

While the pressure to be released is controlled by using the 2-4/B duty solenoid 24 in the illustrated embodiment, the released pressure may be controlled by using the 2-4/B timing solenoid 26.

While the first predetermined timer value T1 is given as a fixed value in the illustrated embodiment, a variable delay time may be determined depending upon the throttle opening (or other signal representing the engine torque, such as an amount of the intake air of the engine or a basic pulse width of the fuel injection), or vehicle speed, type of down shifting or level of the oil temperature. The variable delay time may be also determined depending upon two or more of parameters including the vehicle speed, throttle opening, type of downshifting and the oil pressure.

While the second predetermined timer value T2 is set in the timer to control the period of time during which the pressure is applied for pre-charging the low clutch accumulator in the initial period of downshifting, the actual gear ratio may be monitored instead so that the applied pressure is reduced at the moment when the actual gear ratio changes from the gear ratio of the gear position established before the downshifting.

While the second predetermined timer value T2 and third predetermined timer value T3 are given as fixed values in the illustrated embodiment, these timer values T2, T3 may be corrected through learning each time the downshifting is effected, by comparing gear ratios or rate of changes in the gear ratios, for example, so as to assure high shifting quality without being influenced by variations or chronological changes in the system.

What is claimed is:

1. A downshift control device for an automatic transmission wherein the transmission is shifted down to a first gear position to be established after downshifting, by releasing an oil pressure from a first engaging element that has been engaged in a second gear position established before the downshifting while applying an oil pressure to a second engaging element that has been released in the second gear position, said downshift control device comprising:

power-on downshift determining means for determining whether a downshift command is generated to shift down the automatic transmission while an accelerator pedal is being depressed;

gear ratio detecting means for detecting a gear ratio of the transmission that changes during power-on downshift control;

an accumulator provided in an oil path that leads to said second engaging element to be engaged upon downshifting;

an applied pressure control actuator for controlling a pressure to be applied to said second engaging element, by selectively supplying a pressurized oil to a back pressure chamber of said accumulator and removing the pressurized oil from the back pressure chamber; and downshift applied pressure control means for generating a first command to supply the pressurized oil to said back pressure chamber of said accumulator, during a period starting from a first time when said downshift command is generated to a second predetermined time or a second time when the gear ratio detected by said gear ratio detecting means starts being changed, then generating a second command to remove the pressurized oil from the back pressure chamber until the detected gear ratio reaches a predetermined gear ratio just before completion of shifting, and then generating a third command to supply the pressurized oil to the back pressure chamber after the detected gear ratio reaches said predetermined gear ratio, said first, second and third commands being generated to said applied pressure control actuator.

2. A downshift control device for an automatic transmission according to claim 1, further comprising:

downshift released pressure control means for generating to a released pressure control actuator a command to maintain an engaging capacity of said first engaging element to be released upon downshifting, during said period starting from said first time when said downshift command is generated to said second predetermined time or said second time when the gear ratio detected by said gear ratio detecting means starts being changed, while the command to supply the pressurized oil is generated to said applied pressure control actuator.

3. A downshift control device for an automatic transmission according to claim 2, wherein said downshift released pressure control means temporarily generates a command to increase the engaging capacity of said first engaging element to said released pressure control actuator, from a point of time when the gear ratio detected by said gear ratio detecting means reaches a gear ratio that is smaller than said predetermined gear ratio.

* * * * *